Patented Sept. 25, 1934

1,974,507

UNITED STATES PATENT OFFICE 1,974,507

PROCESS OF PRODUCING HEAVY METAL AND ALKALI-EARTH METAL SALTS OF NAPHTHENIC ACIDS

Franz Pohl, Ludwigshafen-on-the-Rhine, and Bernhard Isenbeck, Frankfort-on-the-Main-Schwanheim, Germany, assignors to I. G. Farbenindustrie Aktiengesellschaft, Frankfort-on-the-Main, Germany No Drawing. Application February 15, 1930, Serial No. 428,823. In Germany February 22, 1929

3 Claims. (Cl. 260—11)

This invention relates to a process for producing heavy metal salts of naphthenic acids, more particularly to a process for producing those heavy metal salts of naphthenic acids which are used as siccatives in the manufacture of varnishes.

Hitherto such salts were produced by precipitating, at ordinary temperature, soaps derived from naphthenic acids with solutions of salts of the corresponding metals. The precipitate of the naphthenate was washed and filtered off by suction or immediately filtered off by suction and then dried at about 40° C.

The precipitates, thus obtained, are in a pasty and sticky condition, and it is therefore very difficult and all but impossible to wash them out thoroughly at ordinary temperature either before or after the sucking operation, inasmuch as rather considerable amounts of the alkali metal salts formed are left behind in the precipitate, whereby the value of the naphthenates and their percentage contents of active siccative metals are greatly impaired and the varnishes and lacquers produced therewith are unfavorably influenced. Moreover it is very difficult to filter off the precipitated naphthenates by suction on an industrial scale, the filter pores being easily clogged up by the toughish products of precipitation.

Finally, the drying of the product in a drying chamber at about 40° C. takes much time and labor and is very expensive, and besides the drying is only imperfect, as, at the temperature indicated, a superficial incrustation already takes place, whereby the further evaporation of the occluded water is rendered difficult or even impossible. This water content, moreover, likewise impairs the treatment of the naphthenates in the manufacture of varnishes and lacquers.

Now we have found that these drawbacks can easily be avoided and the difficulty of the washing out operation can be completely overcome by carrying out the steps consisting in the neutralization of the naphthenic acid (commonly called saponification), in the precipitation and in washing the precipitated product, while maintaining the liquid in the boiling state. By this means the alkali metal salts are retained in the solution and are completely removed by three washing operations.

After the water employed in the final wash has been withdrawn, the desiccation and drying may be carried out, preferably in the same vessel without any difficulty by maintaining the washed product in a molten state at about 130° C. for a short time, until the water is completely removed. The molten naphthenate, thus purified, may be directly run into suitable containers from the producing vessel.

Preferably, soluble, heavy metal salts such as chlorides, sulfates, nitrates, acetates etc. are employed as precipitants.

The preparation of the aforementioned siccatives is thus considerably simplified by the present process and the drying is effected by far more rapidly than before. The obtained products are far superior as regards their purity and quality to those obtained by the old process and, when casked in the molten state, are much more suitable for being employed in the manufacture of lacquers and varnishes.

Furthermore we have ascertained that, for saponifying the naphthenic acids, when operating according to our invention, caustic soda or soda ash solution may be advantageously substituted for the caustic potash solution hitherto used without impairing the output and quality of the final product.

Examples 1. 1000 parts of raw or purified naphthenic acid are neutralized (saponified) with 200 to 210 parts by weight of caustic soda at boiling temperature, while stirring. From the clear soap solution a manganese-lead-naphthenate is quantitatively precipitated by adding a solution of 300 parts by weight of lead nitrate and about 310 parts by weight of crystallized manganous chloride. The manganese-lead-naphthenate, thus obtained is washed and desiccated or dried as above specified.

2. The soap solution produced from 1000 parts by weight of naphthenic acid in the manner described in Example 1 is precipitated while hot with a solution of 108.5 parts by weight of crystallized cobaltous chloride and 203 parts by weight of zinc chloride. The resultant cobalt-zinc-naphthenate is washed and dried as above described.

We claim:

1. In the process of producing siccatives comprising naphthenic acid salts of heavy metals by the interaction of aqueous solutions of alkali metal naphthenates with aqueous solutions of equivalent quantities of heavy metal salts, the improvement which comprises precipitating the heavy metal naphthenates and washing the precipitate with water, said steps both being carried out at boiling temperature, and drying the washed precipitate while maintaining it in a molten state until the water is completely vaporized.

2. In the process of producing a cobalt-zinc-naphthenate by the interaction of an aqueous solution of an alkali metal naphthenate with an aqueous solution of an equivalent quantity of cobaltous chloride and zinc chloride, the improvement which comprises precipitating the cobalt-zinc naphthenate and washing the precipitate with water said steps both being carried out at boiling temperature, and drying the washed precipitate while maintaining it in a molten state until the water is completely vaporized.

3. In the process of producing a manganese-lead-naphthenate by the interaction of an aqueous solution of an alkali metal naphthenate with an aqueous solution of an equivalent quantity of manganous chloride and lead nitrate, the improvement which comprises precipitating the manganese-lead-naphthenate and washing the precipitate with water said steps both being carried out at boiling temperature, and drying the washed precipitate while maintaining it in a molten state until the water is completely vaporized.

FRANZ POHL.
BERNHARD ISENBECK.